US008655562B2

(12) United States Patent
Juhlin-Dannfelt et al.

(10) Patent No.: US 8,655,562 B2
(45) Date of Patent: Feb. 18, 2014

(54) METHOD AND SYSTEM FOR SETTING A VEHICLE IN MOTION

(75) Inventors: Peter Juhlin-Dannfelt, Hägersten (SE); Richard Boström, Nykvarn (SE); Peter Asplund, Mariefred (SE); Johan Kingstedt, Årsta (SE)

(73) Assignee: Scania CB AB (SE)

( * ) Notice: Subject to any disclaimer, the term of this patent is extended or adjusted under 35 U.S.C. 154(b) by 44 days.

(21) Appl. No.: 13/395,487

(22) PCT Filed: Sep. 13, 2010

(86) PCT No.: PCT/SE2010/050967
§ 371 (c)(1),
(2), (4) Date: Mar. 12, 2012

(87) PCT Pub. No.: WO2011/031225
PCT Pub. Date: Mar. 17, 2011

(65) Prior Publication Data
US 2012/0173099 A1   Jul. 5, 2012

(30) Foreign Application Priority Data

Sep. 14, 2009 (SE) ........................................ 0950662

(51) Int. Cl.
*G06F 7/00* (2006.01)
(52) U.S. Cl.
USPC .............................. 701/53; 477/107; 123/361
(58) Field of Classification Search
USPC ............... 701/53, 32.9, 102, 95, 54; 477/107, 477/110; 123/361, 351, 41.01, 179.2
See application file for complete search history.

(56) References Cited

U.S. PATENT DOCUMENTS

| 4,416,360 A | 11/1983 | Fiala ............................ 192/0.76 |
| 6,276,472 B1 | 8/2001 | Takashima et al. .......... 180/65.2 |
| 2002/0019691 A1* | 2/2002 | Matsubara et al. ............. 701/54 |
| 2002/0117860 A1 | 8/2002 | Man et al. ........................ 290/46 |
| 2004/0159479 A1 | 8/2004 | Morimoto et al. ........... 180/65.3 |

FOREIGN PATENT DOCUMENTS

EP   1 932 704   6/2008

OTHER PUBLICATIONS

International Search Report mailed Dec. 9, 2010 in corresponding PCT International Application No. PCT/SE2010/050967.

* cited by examiner

*Primary Examiner* — Thomas Black
*Assistant Examiner* — Luke Huynh
(74) *Attorney, Agent, or Firm* — Ostrolenk Faber LLP

(57) ABSTRACT

A method for setting a vehicle in motion: The vehicle includes a combustion engine for generating driving force for transmission to at least one powered wheel via a clutch and a gearbox. The driving force is selectively transmitted from the engine to the powered wheels by closure of the clutch. Gear changes by the gearbox are at least partly controlled by a control system. With the clutch closed and upon demand for the vehicle to be set in motion with the clutch closed, the control system activates the vehicle's starter motor with gear engaged, and uses the starter motor to accelerate the combustion engine to an initial speed which represents a speed at which the combustion engine will start.

14 Claims, 2 Drawing Sheets

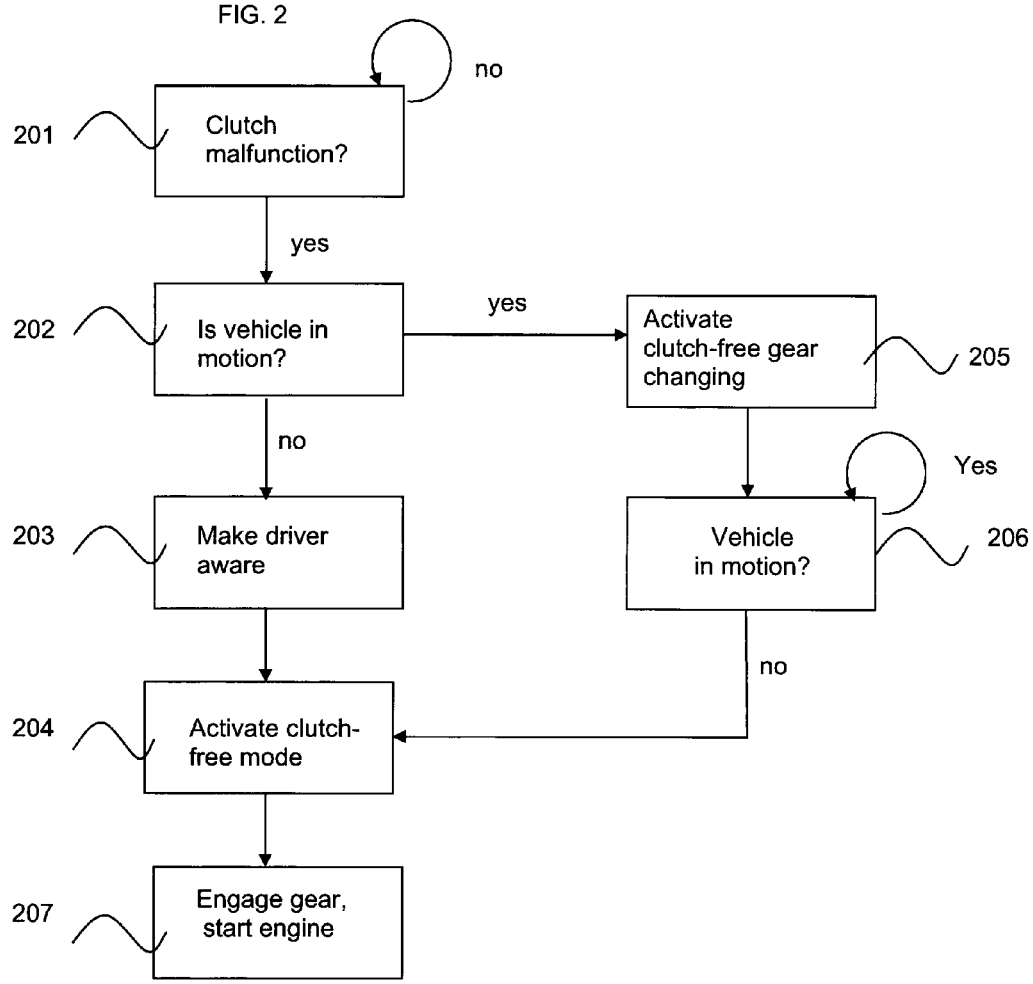

METHOD AND SYSTEM FOR SETTING A VEHICLE IN MOTION

CROSS-REFERENCE TO RELATED APPLICATIONS

The present application is a 35 U.S.C. §§371 national phase conversion of PCT/SE2010/050967, filed Sep. 13, 2010, which claims priority of Swedish Application No. 0950662-7, filed Sep. 14, 2009, the contents of which are incorporated by reference herein. The PCT International Application was published in the English language.

FIELD OF THE INVENTION

The present invention relates to a method for setting a vehicle in motion, e.g. when there is a malfunction in its power train. The invention also relates else to a system and a vehicle performing the method.

BACKGROUND TO THE INVENTION

It is generally the case that the number of functions with which vehicles in general and heavy vehicles in particular are equipped is ever-increasing. These functions are often controlled by one or more control units, or controllers, and are often intended to enhance the vehicle's passive and active safety and to render travel in it as comfortable as possible for the driver and any passengers.

The increase in the number of vehicle functions is accompanied by increasing risk of one or more functions malfunctioning. Any fault which occurs may be drawn to the driver's attention, e.g. by a warning lamp lighting up, whereupon desired measures can if necessary be taken. A malfunction may be more or less serious depending on the nature of the function concerned. For example, a fault in a function which only affects the comfort of the driver and/or passengers need not make the vehicle more difficult to drive. In contrast, a fault of a more serious kind which in some way puts at risk the safety of the driver/passengers and/or the possibility of driving the vehicle safely will need to be dealt with immediately. However, it is often both time-consuming and expensive to rescue a heavy vehicle, which makes it desirable that as far as possible the vehicle should be able independently to reach a workshop or some other suitable location even when a fault has occurred.

Heavy vehicles are therefore often capable of being put into a so-called "limp home" state whereby some functions can be switched off while the most important are kept at least partly operational so that the vehicle can passably reach a suitable location under its own power even if its maximum speed in such a limp-home state may be limited to a substantially lower speed than it can normally be driven at.

Although in many cases the limp-home state makes it possible for the vehicle to travel safely to a desired location without emergency assistance, there are also situations in which this is not possible. There is therefore a need for improved means of avoiding, for example, any need to be rescued in certain situations.

Accelerating the engine to a speed at which it will start thus makes it possible for the engine to be started despite the power train being closed, e.g. because of a fault which prevents opening of said clutch. The speed at which the engine starts may depend on the load exerted upon the engine by the closed power train. However, diesel engines in particular have a high available torque even at low engine speeds, so even with the power train closed the engine will often start at a relatively low engine speed. The invention thus makes it possible for the vehicle to continue its journey despite the clutch malfunction.

The vehicle can also be set in motion in a controlled way without behaving in a way which would be surprising to the driver, since the demand for setting in motion with the clutch closed will show that the driver is actively aware of the vehicle's behavior with the power train closed.

Further characteristics of the present invention and advantages thereof are indicated by the detailed description of embodiment examples set out below and the attached drawings.

DETAILED DESCRIPTION OF EMBODIMENT EXAMPLES

As mentioned above, rescuing a heavy vehicle may be both time-consuming and expensive, so it is often preferable that the vehicle should be able independently to reach a workshop or some other suitable location even when a serious fault has occurred.

Heavy vehicles are often provided with gearboxes which change gear automatically. However, these gearboxes do not usually take the form of automatic gearboxes in a traditional sense, but of "manual" gearboxes with automatic control of gear changing. This is due partly to the fact that manual gearboxes are substantially less expensive to make, but also to their greater efficiency.

The fact that the gearbox is of a manual type means that, unlike conventional automatic gearboxes, it needs a clutch in order to be able to engage a gear when the vehicle is stationary without risk of causing damage to the power train.

This clutch is usable in different ways with different types of power trains. In one type, the clutch function may be controlled by the vehicle's driver by using a clutch pedal, in which case the clutch is used when setting the vehicle in motion from stationary but all other gear changes can be effected by the vehicle's control system with the clutch closed.

Power trains of another type but likewise with gearboxes of the above type use a clutch which is entirely controlled automatically by the vehicle's control system, and the driver has access to only an accelerator pedal and a brake pedal. Normally, when a vehicle equipped with an automatically controlled clutch is being set in motion, its control system will close the clutch, and thereby couple the engine to the rest of the power train, when the driver presses the accelerator pedal.

Irrespective of whether the clutch is controlled manually or by the vehicle's control system, a functioning clutch is therefore necessary for it to be possible for the vehicle to be set in motion in a conventional way.

An example of a possible situation which normally requires emergency assistance is malfunction of the clutch itself or of a clutch-controlling means such as a clutch actuator. The clutch is usually spring-loaded so that when there is no pressure on the clutch actuator/the clutch pedal the clutch will be in a closed position whereby the engine is connected to the gearbox.

The vehicle cannot be set in motion if its clutch cannot be opened. This is because for safety reasons heavy vehicles are so arranged that the starter motor cannot be activated without the power train being broken, i.e. the clutch has to be open or else neutral gear be engaged.

In other situations where the clutch is closed and a gear is engaged while at the same time the starter motor is activated, the vehicle would lurch forwards in an uncontrolled way and risk colliding with any object situated in front of it. In contrast, if the engine is started with neutral gear engaged, or if the engine is already running with neutral gear engaged, it is not possible to engage a gear with the clutch closed without risk of causing serious damage to the power train.

However, it is desirable that the vehicle should, despite a malfunctioning clutch, still be capable of being setting in motion and travelling, e.g. to a workshop, without need for emergency assistance. The present invention solves this by means of a method as below which makes it possible to set the vehicle in motion in a controlled way with gear engaged.

SUMMARY OF THE INVENTION

An object of the present invention is to propose, for control of a vehicle when it is being set in motion, a method which solves the above problem.

The present invention relates to a method for setting a vehicle in motion, where the vehicle comprises a combustion engine for generating driving force for transmission to at least one powered wheel via a clutch and a gearbox. The driving force can be transmitted selectively from the engine to the powered wheels by closing, i.e. engaging, the clutch, and gear changes by means of the gearbox are at least partly controlled by a control system situated in the vehicle.

With the clutch closed, the control system responds to a demand for the vehicle to be set in motion, by activating its starter motor with gear engaged, and by using the starter motor to accelerate the engine to an initial speed which represents a speed at which the combustion engine will start.

BRIEF DESCRIPTION OF THE DRAWINGS

FIG. 2 depicts an example of a method according to the present invention.

DETAILED DESCRIPTION OF EMBODIMENT EXAMPLES

Figure 1:
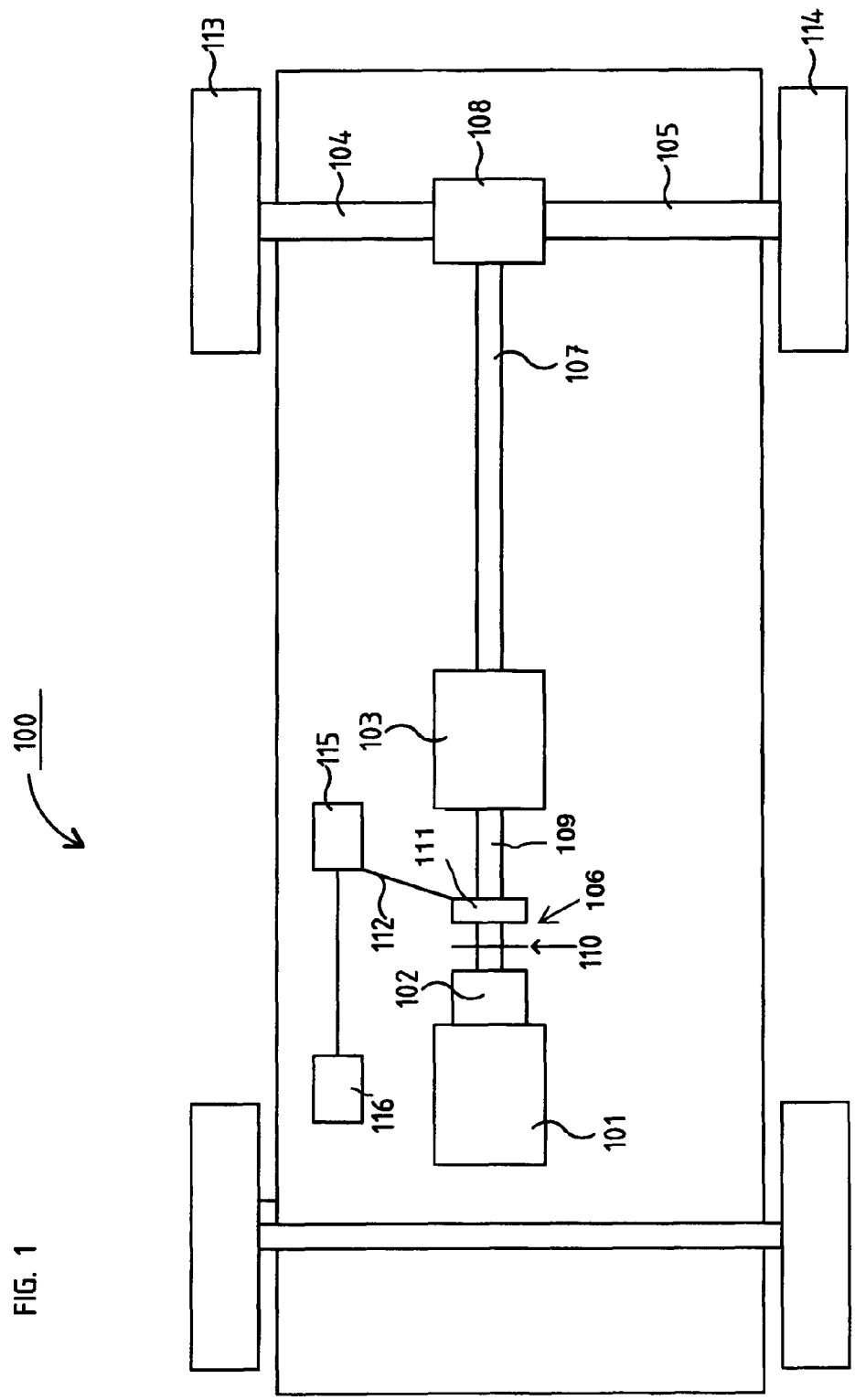
FIG. 1 depicts a power train in a vehicle with which the present invention may with advantage be used.

FIG. 1 depicts an example of a power train in a vehicle 100 according to a first embodiment example of the present invention. The vehicle 100 schematically depicted in FIG. 1 comprises only one axle with powered wheels 113, 114, but the invention is also applicable to vehicles which have more than one axle provided with powered wheels. The power train comprises a combustion engine 101 connected in a conventional way to a gearbox 103 via a clutch 106.

The vehicle further comprises drive shafts 104, 105 connected to the vehicle's powered wheels 113, 114 and driven by an output shaft 107 from the gearbox 103 via a shaft gear 108, e.g. a conventional differential.

The clutch 106 is of disc type whereby a friction element (disc) 110 connected to the input shaft 109 of the gearbox 103 engages selectively with the engine's flywheel 102 in order to transmit driving force from the combustion engine 101 to the powered wheels 113, 114 via the gearbox 103. The engagement of the clutch disc 110 with the engine's output shaft is controlled by means of a pressure plate 111 which is movable sideways by means of, by example, a lever arm 112, the function of which is controlled by a clutch actuator 115 or conventional clutch pedal (not depicted). The influence of the clutch actuator 115 on the lever arm 112 is controlled by the vehicle's control system. The present invention is applicable both in vehicles with manually controlled clutches and in vehicles with automatically controlled clutches, but is perhaps particularly advantageous for use in vehicles with an automatically controlled clutch.

Vehicle control systems in modern vehicles usually comprise a communication bus system comprising one or more communication buses for connecting together a number of electronic control units (ECUs), or controllers, and various components located on the vehicle. Such a control system may comprise a large number of control units and the responsibility for a specific function may be shared by two or more control units. For the sake of simplicity, FIG. 1 depicts only one such control unit 116 which controls the clutch (the clutch actuator 115). In practice, the control of the clutch actuator 115 by the control unit 116 will probably depend, for example, on information received from, for example, the control unit which is responsible for the function of the gearbox 103 and from the control unit or units which control engine functions.

The method according to the present invention may with advantage be implemented as a computer program comprising program code which, when executed in a computer, causes the computer to effect the method. The computer program is contained in a computer program product's computer-readable medium which takes the form of a suitable memory, e.g. ROM (read-only memory), PROM (programmable read-only memory), EPROM (erasable PROM), flash memory, EEPROM (electrically erasable PROM), hard disc unit, etc.

FIG. 2 depicts a method example 200 according to the present invention for a vehicle with an automatically controlled clutch. The method begins with a step 201 which decides whether the clutch and/or the clutch actuator is/are malfunctioning, in which case it/they will be closed. Normally the clutch (the pressure plate 111) will be spring-loaded so that if the clutch actuator or the clutch pedal does not function the clutch will be closed and not be able to be opened. If step 201 finds that the clutch is malfunctioning and is in a closed state, the method moves on to step 203, which brings the problem to the driver's notice. This may for example be by a message appearing on a display. Thus the driver is immediately made aware of the fault and can act accordingly.

If the vehicle is still in motion, the driver may plan his/her driving so as to avoid unnecessary halts and, if possible, drive to a suitable marshalling point, e.g. a workshop.

If in step 202, the vehicle is in motion when the malfunction is detected, the method moves on to step 205 in which the control system activates a control method for the gearbox whereby clutch-free gear changing is effected. As mentioned above, this type of gear changing is currently already common practice, making it possible in principle for the vehicle to continue its journey as usual.

Activation of clutch-free gear changing thus in principle makes it possible for the vehicle to travel as normal so long as it does not need to be braked to a complete halt or to a speed below that which prevails when the engine is idling with the lowest gear engaged (upon activation of clutch-free gear changing it may also be advantageous to alter the way in which the gears of the gearbox are normally used, e.g. it is possible to ensure that changing down to the absolutely lowest gear actually takes place when necessary in order as far as possible to avoid situations which require opening of the clutch).

In contrast, if the vehicle is already stationary when the fault occurs or if the driver is forced to bring the vehicle to a halt, step 206, e.g. because of a traffic light or some other hindrance, the principle according to the present invention is applied.

If the vehicle is stationary (or has for any reason been forced to come to a halt) when the aforesaid malfunction is detected, the driver may, according to the present invention, actively adopt a limp-home state or "clutch-free mode", step 204. He/she may activate said clutch-free mode by, for example, using a control means to signal to the control system that said clutch-free mode is to be activated. Activation of said clutch-free mode may also be effected via, for example, an MMI (man-machine interface) such as a pressure-sensitive display.

A safety lock normally activated in the vehicle's control system upon detection of a malfunction as above provides assurance that the starter motor cannot turn with gear engaged, with the object of preventing any vehicle movement which is unwanted or unexpected by the driver. This safety lock is cancelled, however, by the driver actively signalling activation of said clutch-free mode as above.

The driver, or preferably the control system, thereafter engages a suitable gear in the gearbox before trying to start the engine, step 207. The control system is preferably so arranged that it always, independently of the driver's choice, imposes in the gearbox a gear which will not cause serious damage to the power train if the vehicle is set in motion with the power train closed, nor require the starter motor to do more than accelerate the engine to a speed at which the engine can start despite the power train being closed, and the weight of the whole vehicle thus bears upon the starter motor so that the combustion engine does in fact also start. As the vehicle also needs to be at as low a speed as possible after being set in motion, this typically means the lowest gear.

According to the present invention, the driver is thus required to actively cancel the lock which normally prevents activation of the starter motor when the power train is closed. This means that he/she will be fully aware of the vehicle's behaviour when it is set in motion, and will therefore certainly not try to set it in motion if there are obstacles in its path. When the driver tries to set the vehicle in motion in clutch-free mode, e.g. by operating a starting key or pressing a starting button, the starter motor will begin to turn the engine, resulting, owing to the closed power train, in the vehicle beginning to move in the direction of travel. Thereafter the starter motor will accelerate the engine to a speed at which the engine can start.

When the engine has started, the vehicle will thus have reached the speed at which it normally moves in the chosen gear when the engine is idling. The driver can thereafter in principle drive the vehicle as usual except that the control system will effect gear changes as above without using the clutch, and he/she can thus drive the vehicle to a suitable workshop or marshalling point for repair. If the driver is forced to brake to a vehicle speed below that corresponding to the engine's idling speed in lowest gear, neutral gear will be engaged when the engine speed has dropped to idling in lowest gear, to prevent the engine stalling. When this happens, the vehicle has to be stopped and the above procedure be repeated to make continued progress possible without risk of causing damage to the power train. The driver has preferably to repeat the activation of clutch-free mode each time the vehicle is set in motion from stationary. The vehicle's control system is also preferably so arranged that braking in said clutch-free mode results in gear changing as necessary right down to lowest gear in order thereby to be able to drive the vehicle with gear engaged as long as possible and hence also avoid to the utmost having to change gear to neutral position, and consequent further setting in motion with the clutch closed.

The result of the above is a solution whereby the driver actively indicates that setting in motion is to take place with gear engaged, and will therefore be aware of how the vehicle will behave when it actually starts to move off.

According to an embodiment of the present invention, the risk of the vehicle presenting behavior which is unexpected by the driver when it is being set in motion is further reduced. In this embodiment example, the driver activates, precisely as before, a clutch-free mode. In this embodiment, mere activation of clutch-free mode is not sufficient to enable the engine to start with the power train closed, since for the starter motor to be activated by the control system when the driver turns the key/presses the starting button he/she has to actively demonstrate awareness of the vehicle's behavior when moving off with the power train closed, by actively signalling such awareness to the control system during the time when the starter motor is being activated. This may for example be done by moving an operating means from a first position to a second position, e.g. by the driver pressing a button, pedal or the like while at the same time using the starting key/starting button to activate the starter motor. The operating means is preferably so arranged that springback means will cause it to revert to the first position when the pressure is removed, whereupon the starter motor will immediately be stopped by the control system if the driver releases the button/pedal/lever.

In the above examples, the vehicle moves off with the lowest gear engaged, but it may do so in any desired gear which does not load the engine/the starter motor so much that it cannot be started. As above, however, it may be advantageous to move off in as low gear as possible, since this results in as low a vehicle speed as possible after moving off.

The invention is described above for a situation where the clutch is fully closed when the vehicle is being set in motion, but it is conceivable that when a fault occurs the clutch may not be fully closed but may still be in a position such that driving force can be transmitted via it. It is generally the case that once the clutch disc comes into contact with the flywheel, torque transmission can take place between the engine and the rest of the power train. The further the clutch is thereafter closed (i.e. the harder the clutch disc frictionally engages the flywheel), the more torque can be transmitted between the engine and the rest of the power train. Exactly how much torque can be transmitted at each point depends on the characteristics of the clutch, which may vary from clutch to clutch.

The present invention is also applicable in situations where the clutch is for any reason closed not fully but sufficiently to allow enough driving force to be transmitted to enable the vehicle to run in a substantially normal way with regard to transmission of driving force from engine to gearbox, so such clutch positions are also covered by the expression "clutch closed" in the attached claims.

The invention claimed is:

1. A method for setting a vehicle in motion, wherein the vehicle comprises a combustion engine for generating driving force for transmission to at least one powered wheel via a clutch and a gearbox, the clutch is configured such that the driving force can be selectively transmitted from the engine to
   the powered wheels by closure of the clutch, and a control system configured and operable for at least partly controlling gear changes by means of the gearbox which is controlled by the control system;
   a vehicle control motor;
   the control system being configured and operable, so that with the clutch closed and upon demand for the vehicle to be set in motion with the clutch closed, the control system performs the steps of:
   activating the vehicle starter motor with gear engaged and using the starter motor to accelerate the combustion engine to an initial speed which corresponds to a speed at which the combustion engine will start with the clutch closed.

2. A method according to claim 1, wherein the control system causes the steps to be effected when a fault prevents opening of the clutch.

3. A method according to claim 1 wherein the clutch is controlled automatically by the control system.

4. A method according to claim 1, further comprising determining whether the vehicle has been activated and demands that the vehicle be set in motion with the clutch closed, then the control system activates the starter motor only for as long as the demand for setting the vehicle in motion with the clutch closed is activated.

5. A method according to claim 4, wherein the demand for setting in motion with the clutch closed is activated by moving an operating device of the vehicle.

6. A method according to claim 5, wherein the demand for setting in motion with the clutch closed is activated by moving an operating device from a first position to a second position.

7. A method according to claim 6, further comprising, if the vehicle's engine start device indicates that the engine is to be started,
activating the starter motor only for as long as the operating device is in the second position.

8. A method according to claim 7, further comprising returning the operating device from the second position to the first position by a springback device when the pressure on the operating device is removed.

9. A method according to claim 1, further comprising controlling engagement of the gear via the control system.

10. A method according to claim 1, further comprising, after the vehicle has been set in motion, controlling upward/downward gear changes with the clutch closed via the control system.

11. A method according to claim 1, further comprising upon braking of the vehicle, changing down to lowest gear in order to prevent engagement of neutral position via the control system.

12. A computer program product comprising a non-transitory computer-readable medium containing a computer program comprising program code, and when the program code is executed in a computer, the program causes the computer to effect the method according to claim 1.

13. A system for setting a vehicle in motion, wherein the vehicle comprises a combustion engine for generating driving force for transmission to at least one powered wheel via a clutch and a gearbox, the clutch is configured such that the driving force is selectively transmitted from the engine to the powered wheels by closure of the clutch, a starter motor for the engine, and a control system configured and operable to at least partly control gear changes by means of the gearbox the control system is configured and operable, with the clutch closed and upon demand for the vehicle to be set in motion with the clutch closed, to:

activating the vehicle starter motor with gear engaged, and using the starter motor to accelerate the engine to an initial speed which represents a speed at which the combustion engine will start with the clutch closed.

14. A vehicle comprising a system according to claim 13.

* * * * *